United States Patent [19]

Hamada et al.

[11] Patent Number: 4,604,742
[45] Date of Patent: Aug. 5, 1986

[54] LOOP TYPE DATA TRANSMISSION SYSTEM

[75] Inventors: Takuji Hamada; Masahiro Takahashi, both of Hitachi; Sadao Mizokawa, Katsuta, all of Japan

[73] Assignee: Hitachi, Ltd., Tokyo, Japan

[21] Appl. No.: 599,165

[22] Filed: Apr. 11, 1984

[30] Foreign Application Priority Data

Apr. 11, 1983 [JP] Japan .................. 58-62295

[51] Int. Cl.$^4$ .............................................. H04J 3/16
[52] U.S. Cl. ..................................................... 370/89
[58] Field of Search ...................... 370/86, 89, 94, 90; 340/825.05

[56] References Cited

U.S. PATENT DOCUMENTS

| | | | |
|---|---|---|---|
| 4,293,948 | 10/1981 | Soderblom | 370/89 |
| 4,482,999 | 11/1984 | Janson et al. | 370/89 |
| 4,491,946 | 1/1985 | Kryskew, Jr. et al. | 370/89 |
| 4,494,233 | 1/1985 | Bahr et al. | 370/89 |
| 4,495,617 | 1/1985 | Ampulski et al. | 370/89 |

FOREIGN PATENT DOCUMENTS 0054077 6/1982 European Pat. Off. .

52-115105 9/1977 Japan .

Primary Examiner—Douglas W. Olms
Assistant Examiner—Kenneth I. Rokoff
Attorney, Agent, or Firm—Antonelli, Terry & Wands

[57] ABSTRACT

A loop type data transmission system based on a token pass principle, wherein a station whose transmission of data is completed passes therethrough a token to the stations located downstream. The station demanding the transmission acquires the right of transmission when received the token, to perform data transmission with a given station. The token signal is classified into a free token representative of the freedom of the line and a busy token representative of occupation of the line. Among a plurality of stations, only one station is destined to execute detection of transmission failure and remedy thereof. This one station is adapted to convert the free token detected upon reconstitution and repeating of the received information into the busy signal and subsequently re-send the free token. The station having sent out the free token after the completed data transmission is transferred to the state for reconstituting and repeating the received information when the busy token returns to that station.

4 Claims, 11 Drawing Figures

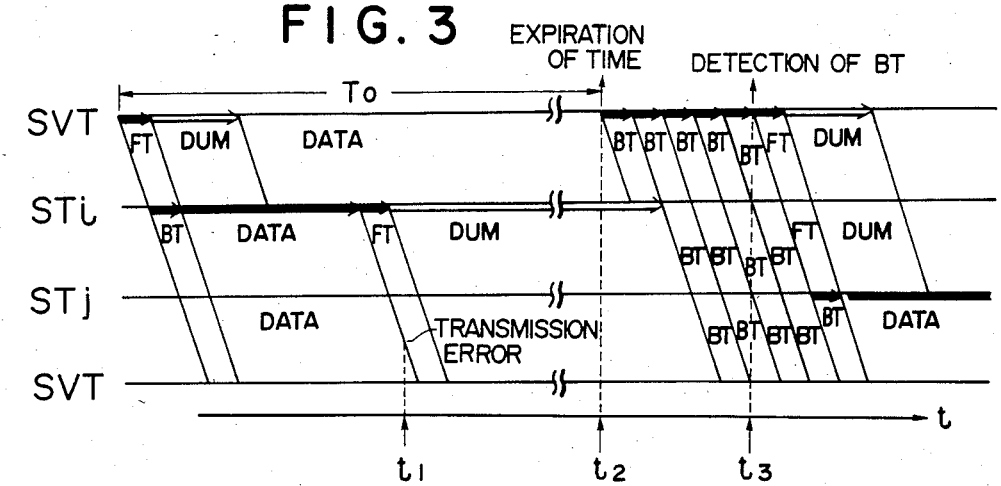
FIG. 3
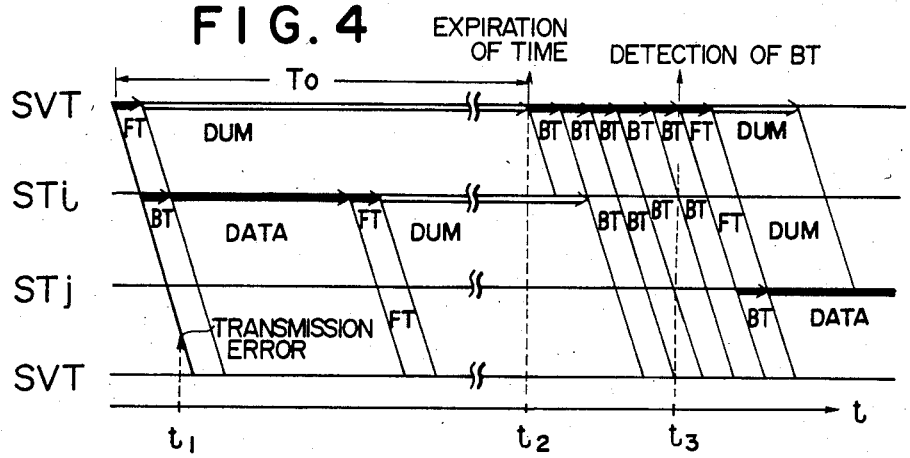
FIG. 4
FIG. 5
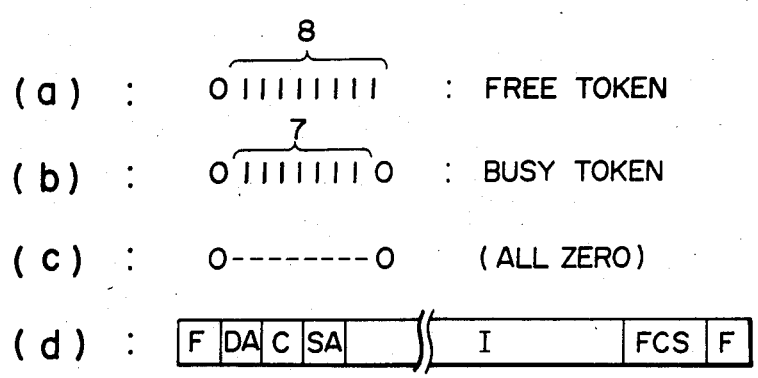

LOOP TYPE DATA TRANSMISSION SYSTEM

BACKGROUND OF THE INVENTION

The present invention relates to a loop type data transmission system in which a plurality of data transmission control stations (hereinafter termed simply as stations) having computers and/or various terminal devices connected thereto are interconnected in cascade through a single loop transmission line, wherein data transmission can be effected between any given ones of the stations.

In the loop type data transmission system mentioned above, only one of the stations is permitted to transmit data at one time. Consequently, control must be made in such a manner that the station demanding data transmission may first acquire the permission to reserve the line and upon completion of the data transmission, the line is released and transferred for reservation by another station.

All the controls involved in acquiring and releasing reservation of the line are herein generally referred to as the line control.

A data transmission control system of control station fixing type in which only a particular station (control station) is imparted with the line control function is certainly advantageous in that all the other stations need not be additionally provided with the respective line control functions. However, this type of data transmission control system can not enjoy a high data transmission efficiency, because every station must inform the control station of completion of the transmission every time the data transmission has been completed. There is suggested in T. Nakano's Japanese Patent Application Laid-Open No. 115105/1977 (Application No. 31312/1976) a data transmission control system of control station turning type in which the line control function is not fixedly imparted to any particular station, but any station having completed the respective data transmission serves as the control station by turns.

Further, a transmission system referred to as the token pass system is disclosed in European Patent Application EP-A No. 0054077 (No. 80107706.6) filed Dec. 8, 1980 and published June 23, 1982.

In the token pass system, token information indicative of the right of transmission is circulated along a loop transmission path. When a transmission station having a request for transmission detects the token, this station fetches the token and transmits data. Subsequently, upon completion of the transmission, the station sends out the token for transferring the right of transmission to another station.

As compared with the control station fixing type transmission system, the control station transferring type system mentioned above is more effective in respect to the transfer of the right of transmission to enhance the transmission efficiency, to an advantage. Further, because there exists no fixed relationship of master and slave among the stations, high degree of dispersion of the transmission control can be realized to another advantage.

However, there arise problems mentioned below in the control station transferring type transmission system when the right of transmission is transferred from the station having completed the transmission to another transmission station.

One of the problems is seen in the fact that, when no transmission stations issue the transmission request, the station having completed the transmission must send out again the returned token (re-sending of the token). Second, in consideration of possibility of disappearance of the token due to transmission failure or disturbance such as noise, the time required for the token to perform a round trip has to be supervised for the re-sending of the token.

Although incorporation of these supervising and control functions in each of the transmission stations is preferable in respect to the dispersion of the transmission control, it is not advantageous in practical applications because of an increase of the hardware required for realizing the transmission stations and complication of the control.

SUMMARY OF THE INVENTION

An object of the present invention is to provide a loop type data transmission system in which transmission control function of the individual transmission stations is simplified without imparing the high efficiency afforded by the token pass system.

According to the invention, the token signal is classified into two types, that is, a free token indicating the freedom or non-occupation of the line and a busy token indicating the occupation of the line, wherein the free token sent out by the station having completed transmission is converted into the busy token to be fed back to that station, to thereby simplify the processing for transmission in each of the individual stations.

According to the present invention, at least one of the individual stations is imparted with control functions such as detection and the remedy of the transmission failure or disturbance. This station is so designed as to convert the free token detected in reproduction or reconstruction and repeating of the received information into the busy token, which is then followed by the re-sending of the free token. In this way, the other transmission stations are free of the token control for the re-sending.

BRIEF DESCRIPTION OF THE DRAWINGS

Other objects and features of the present invention will be more apparent from the following description of the exemplary embodiment taken in conjunction with the accompanying drawings, in which:

FIGS. 3 and 4 show, respectively, transmission timing charts for illustrating occurrence of transmission errors in the loop type transmission system shown in FIG. 1;

FIG. 5 are views showing signal formats of free token, busy token, dummy information and data information, respectively, used in the system shown in FIG. 1;

DESCRIPTION OF THE PREFERRED EMBODIMENTS

Figure 1:
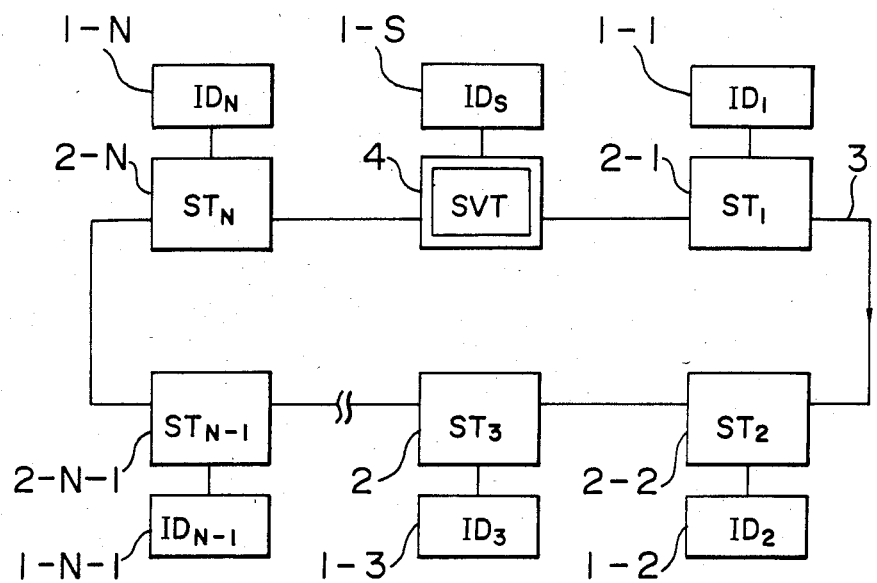
FIG. 1 is a block diagram showing a general arrangement of the loop type data transmission system according to an exemplary embodiment of the invention.

Referring to FIG. 1 which shows in a block diagram a general arrangement of the loop type data transmission system according to an exemplary embodiment of the present invention, information devices ($ID_1$–$ID_N$) such as computers, various types of terminals and the like which are installed geographically distributively at factories, buildings, college campuses and others and denoted generally by 1 and individually by 1-1 to 1-N join and constitute a single data transmission system by way of transmission stations ($ST_1$–$ST_N$) denoted generally by 2 and individually by 2-1 to 2-N. The individual transmission stations 2 are connected in cascade by a single unidirectional transmission path or line 3 to thereby constitute a loop type data transmission network, wherein at least one of the transmission stations is destined to serve as a specific station for performing control and supervision of the status of transmission inclusive of functions for monitoring and remedying failures in transmission. This specific station is designated by a reference numeral 4 and will hereinafter be referred to as the supervising station or SVT in abridgement. Each of the individual transmission stations serves for various functions. Among them, there can be mentioned the functions of reconstitution and relaying (repeating) of signals, control of reservation or occupation of the line, reception and transmission of serial data or information, control of interface with connected information devices and others. On the other hand, the supervisory station 4 performs as main functions thereof feeding of a system clock signal, compensation of delay involved in a round trip along the loop, initialization processing for transmission, supervision of the state of transmission, control of realization of the loop network. In the following description, the same numerals and symbols are used for designating same or equivalent parts throughout all the drawings.

Operation of the loop type data transmission system shown in FIG. 1 will be described by referring to FIG. 2 which shows a time chart for illustrating a token-pass control operation of the supervisory station (SVT) 4 and the transmission stations ($St_i$, $ST_j$) 2 which have the request for transmission.

In the case of the illustrative embodiment, it is assumed that the token signal is composed of a free token (FT) which indicates nonoccupation or freedom of the line and a busy token (BT) indicating occupation of the line by certain one of the transmission stations. The supervisory (SVT) station 4 destined to supervise and control the state of transmission sends out the free token indicative of the freedom of the line. After the free token has been sent out, the supervisory station 4 continues to send out dummy information DUM in order to prevent the information coming from the stations located upstream from passing through the supervisory station or SVT 4. The transmission demanding station ($ST_i$) which is located downstream of the SVT 4 and has detected the free token FT converts it into the busy token BT indicating the occupation of the line to thereby prevent the right of transmission from being transferred to a further one of the transmission stations located downstream of that which has detected the free token. After the conversion of the free token FT to the busy token BT, the transmission station in turn transmits data information, which is followed by transmission of the free token FT for transferring the right of transmission to the further station ($ST_j$) as well as transmission of the dummy information DUM. In the meantime, when the busy token BT resulting from the token conversion performed by the transmission station $ST_i$ is detected by the supervisory station or SVT, the latter stops the sending of its own dummy information and resumes the pass state for simply repeating the received information in addition to the supervision of the token information. As the consequence, the busy token BT is erased by the supervisory station or SVT 4, allowing the succeeding data information DATA to return to the sending transmission station $ST_i$. The further downstream transmission station ($ST_j$) 2 demanding the transmission and detected the free token FT performs operation similar to that of the aforementioned transmission station $ST_i$ to send the data information DATA, the free token FT and the dummy information DUM in this sequence after conversion of the detected free token FT into the busy token BT. In the meanwhile, when the busy token BT resulting from the conversion arrives at the preceding transmission station $ST_i$ by way of the supervisory station SVT which is in the pass state, this transmission station $ST_i$ stops sending its own dummy information to be subsequently switched or transferred to the pass state. At the time when the busy token BT is acquired and the dummy information DUM is erased, the transmission station $ST_i$ fetches the very information that was sent out by this station itself after a round trip along the loop. Subsequently, the transmission station remains in the pass state to pass therethrough the information originating in the station located upstream, while rendering the supervision of the token information unnecessary. The free token FT sent out by the transmission station $ST_j$ can arrive at the supervisory station SVT since there is no transmission station 2 demanding the transmission. At this time, however, the supervisory station SVT 4 which is in the pass state and supervises the token information necessarily converts the received free token FT into the busy token BT even when the supervisory station SVT has no transmission request of its own, and transmits again immediately after the conversion the free token FT instead of sending the data information DATA, which is followed by the continuous sending of the dummy information DUM. In the meanwhile, the busy token BT resulting from the token conversion effected by the supervisory station SVT arrives at the transmission station $ST_j$, whereupon the station $ST_j$ stops sending its own dummy information DUM and resumes the pass state as in the case of the transmission station $ST_i$. At that time point, the busy token BT is fetched and absorbed, resulting in that only the succeeding free token FT is allowed to return to the supervisory station or SVT. Since the supervisory station SVT is not in the pass state at that time and continues to send out the dummy information DUM, the free token FT detected by the supervisory station is not converted to the busy token BT. Unless the supervisory station has its own information to be sent out at that time, the free token FT is again sent out, being followed by the sending of the dummy information DUM.

In this way, the loop type data transmission system according to the illustrative embodiment of the invention is so arranged that, whenever the supervisory station SVT 4 detects the free token FT in the pass state, the detected free token is necessarily converted into the busy token BT and that the supervisory station resumes subsequently the transmitting state to send out again the free token FT (i.e. re-sending of FT). This arrangement is adopted for the purpose of concentrating the functions of supervising and controlling the state of transmission to the specific supervising station SVT. Otherwise, the two functions, i.e. re-sending of the free token FT and the supervision and control of the transmission failure or error would be required to be implemented in each of the transmission stations 2, as elucidated below.

FIG. 3 shows a transmission timing chart on the assumption that an error of transmission occurs at a time point $t_1$ in the free token FT issued by the transmission station upon completion of the transmission, resulting in the loss of the intrinsic information. On this assumption, the transmission station $ST_i$ of which transmission has been completed can not detect the busy token BT. Accordingly, this station $ST_i$ can not be switched or transferred to the pass state and continues to send out the dummy information DUM. However, the supervisory station (SVT) 4 is so configured as to supervise constantly the round trip period of the token information even in the pass state. This self supervising mechanism of the supervisory station becomes invalid at a time point $t_2$, unless the token makes appearance within a predetermined time $T_0$. Accordingly, the supervisory station continues to send out the busy token BT until the one round trip thereof has been confirmed. When the busy token BT is detected after the round trip at a time point $t_3$, the free token FT is newly sent out and the transmission is restored by subsequently sending out the dummy information DUM. In this way, the transmission station $ST_i$ of which transmission has been completed can be shifted or transferred to the pass state upon detection of the busy token BT sent out by the supervisory station SVT after lapse of the predetermined time $T_0$. When any one of the transmission stations $ST_j$ demands transmission later on, this station detects the free token FT newly sent out from the supervisory station SVT and converts it into the busy token BT, which is followed by the sending of the data information DATA. In this way, the normal transmitting operation can be regained.

Figure 2:
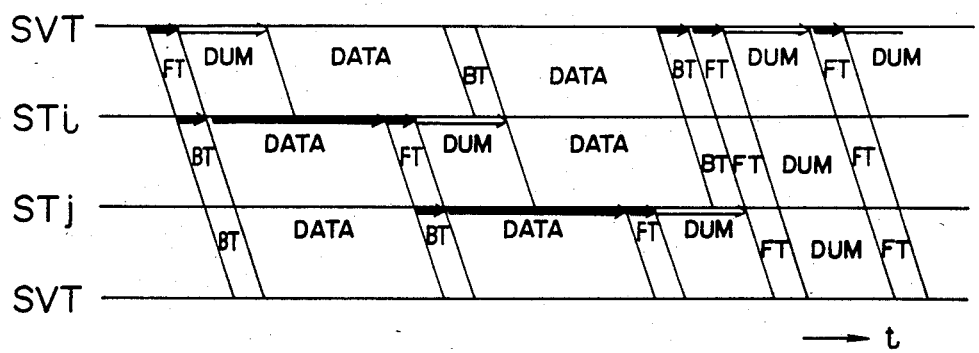
FIG. 2 shows a transmission timing chart for illustrating operation of the loop type transmission system shown in FIG. 1.

FIG. 4 shows a transmission timing chart on the assumption that a transmission error occurs at a time point $t_1$ in the busy token BT sent out by one of transmission stations $ST_i$ shown in FIG. 2, whereby the intrinsic information is lost. In this case, the supervising station SVT is not transferred to the pass state because it can not detect the busy token BT. Consequently, the supervisory station SVT continues to send out the dummy information DUM. On the other hand, the transmission station $ST_i$ under consideration transmits the busy token BT, the data information DATA and the free token FT in this sequence and then continues to send out the dummy information DUM. However, when no token makes appearance within the predetermined time $T_0$, the supervisory station SVT confirms expiration of the time. In that case, restoration of transmission can be made through the procedure similar to that described hereinbefore in conjunction with FIG. 3. There may arise a situation in which continuation of the transmission is rendered impossible due to occurrence of the transmission error of such type in which token information springs out. In this case, the transmission can well be restored through the similar procedure taken in the case where the token information is lost. In this respect, any further description will be unnecessary. As will be seen from the foregoing description, any of the individual transmission stations 2 is free of the necessity to send out again the free token FT since the free token sent by any given one of the transmission stations returns without failure to the latter after having been converted to the busy token by the succeeding transmission demanding station or the supervisory station SVT. Further, because the round trip of the token information is supervised by the supervisory station 4 even after the transmission of the free token FT or the transfer to the pass state of the station 4, there is no necessity to supervise the transmission error or failure in the individual transmission stations.

Next referring to FIG. 5, there are shown examples of formats of the information signals described above, wherein a format of the free token FT is illustrated at (a), a format of the busy token BT is illustrated at (b), a format of the dummy information is illustrated at (c), and a format of the data information DATA is illustrated at (d). The data information DATA shown at (d) is prepared on the basis of the frame format stipulated by HDLC (High-Level Data Link Controls) and is composed of flag information F (01111110) indicating stops or punctuations of information, a destination address section DA, a control section C indicating the type of frame and controlling the repeated transmission, an origin or sender address section SA, an information section I, an error check section FCS and the like. Zero bits are placed throughout the destination address section DA to the error check section FCS so that more than five bits of logic "1" will not make appearance in succession. Accordingly, detection of the flag information F (01111110) can be easily realized by making use of the fact that 6 bits of logic "1" make appearance in succession. In order to allow the token information to be detected in the similar manner, the free token FT shown in FIG. 5 at (a) includes eight bits of "1" in succession, while the busy token BT includes seven bits of "1" in succession. Furthermore, although the dummy information DUM shown at (c) is constituted by a string of zero bits, this information may be represented by a succession of the flag information F. By preparing the formats of the information signals in this manner, conversion of the free token FT shown at (a) into the busy token BT shown at (b) in each of the transmission stations 2 or in the supervisory station 4 may be readily accomplished by merely inverting the eighth bit of "1" to the zero bit.

Figure 6:
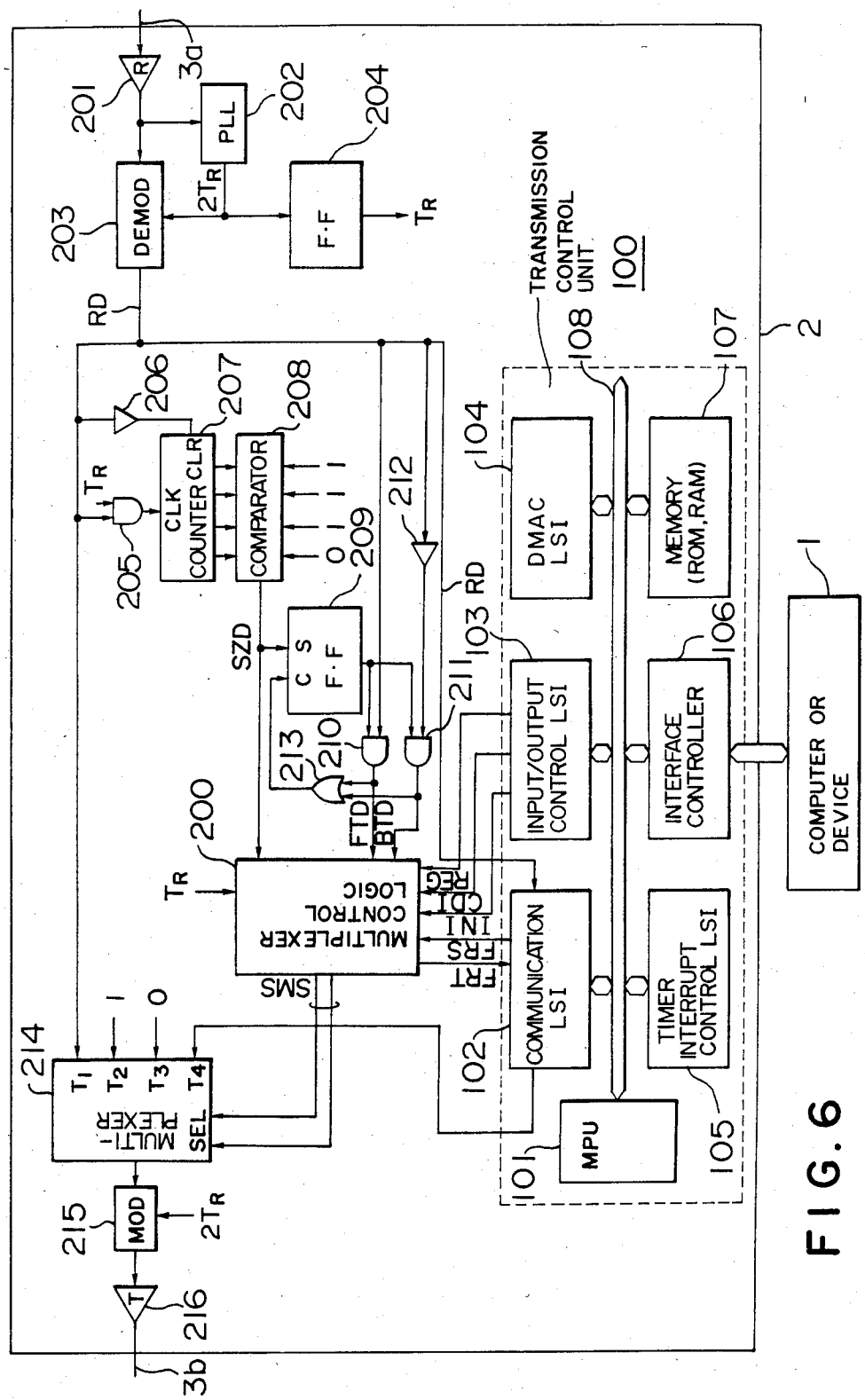
FIG. 6 shows in a block diagram a hardware structure of a transmission station (2) shown in FIG. 1.

Referring to FIG. 6 which shows in a block diagram an exemplary hardware structure of the transmission station 2 shown in FIG. 1, the incoming various signals on the transmission path 3a are received by a receiver 201 and demodulated by a demodulator 203 to be inputted to a transmission control unit 100 as the received information or data RD. The transmission control unit or TCU 100 primarily serves to control the reception and transmission of the data information (DATA) frame exemplified in FIG. 5 at (d) and comprises a microprocessor unit 101, a communication LSI (large scale integrated circuit) 102, an input/output control LSI 103, a direct memory access control LSI (DMAC) 104, a timer interrupt control LSI 105, an interface control unit 106 and a memory unit 107 including a ROM (read-only memory) and a RAM (random access memory), all being interconnected by a common bus 108.

A phase-locked loop PLL 202 serves to extract from the output of the receiver 201 a clock signal $2T_R$ which is utilized as the clock signal in the demodulator 203 and a modulator 215 described hereinafter. The clock signal $2T_R$ undergoes a frequency division by a flip-flop circuit 204, whereby a clock $T_R$ is derived.

The received information signal RD is applied to the input of an AND gate 205 together with the clock $T_R$, the output of the AND gate 205 being supplied to a count input terminal of a counter 207 which counts the number of the bits "1s" inputted successively. So long as the bit of the received information is zero, the counter 207 is always reset by the output signal of an inverter 206. The counted value of the counter 207 is compared with a set value (0111) through a comparator 208. When the counted value of the counter 207 is equal to the set value (0111), which means that the seven bits of "1" are successively inputted, the comparator 208 produces an output signal SZD = "1" to inform a multiplexer control logic 200 of the detection of the seven successive bits of "1".

The flip-flop 209 is set in response to the signal SZD = "1" and reset by the output signal of an OR gate 213. An AND gate 210 is enabled when the bit of the received information RD inputted at the timing which follows the setting of the flip-flop 209 is "1", to thereby output a signal FTD = "1" representing the detection of the free token including eight successive bits of "1". This output signal FTD = "1" is supplied to the multiplexer control logic 200.

On the other hand, an AND gate 211 is enabled through an inverter 212 when the bit of the received information RD inputted at the timing immediately following the setting of the flip-flop 209 is "0", to thereby produce an output signal BTD = "1" representative of the busy token including seven successive bits of "1". This output signal is supplied to the multiplexer control logic 200.

Since the flip-flop 209 is reset in response to the output of the OR gate 213 as noted above, the flip-flop 209 is reset by either FTD = "1" or BTD = "1". In addition to the signals SZD, FTD and BTD mentioned above, the multiplexer control logic 200 is supplied with an initial interrupt signal INI from the input/output control LSI 103, a signal CDI for designating the supervisory station or the transmission station, a frame transmission request signal REQ and a frame transmission completion signal FRS from the communication LSI 102, whereby the multiplexer control logic 200 produces a select signal SMS to a multiplexer 214 and a frame transmission timing signal FRT to the communication LSI 102. The multiplexer 214 is provided with an input terminal $T_1$ for the received information RD, an input terminal $T_2$ for the bit of "1", an input terminal $T_3$ for the bit of "0", and an input terminal $T_4$ for the data transmission information from the communication LSI 102, these input signals being selected by the select signal SMS supplied from the multiplexer control logic 200.

The output signal of the multiplexer 214 is modulated by a modulator 215 and outputted on a transmission path 3b through the transmitter 216.

The interface control unit 106 is connected to a computer or device 1.

Figure 7:
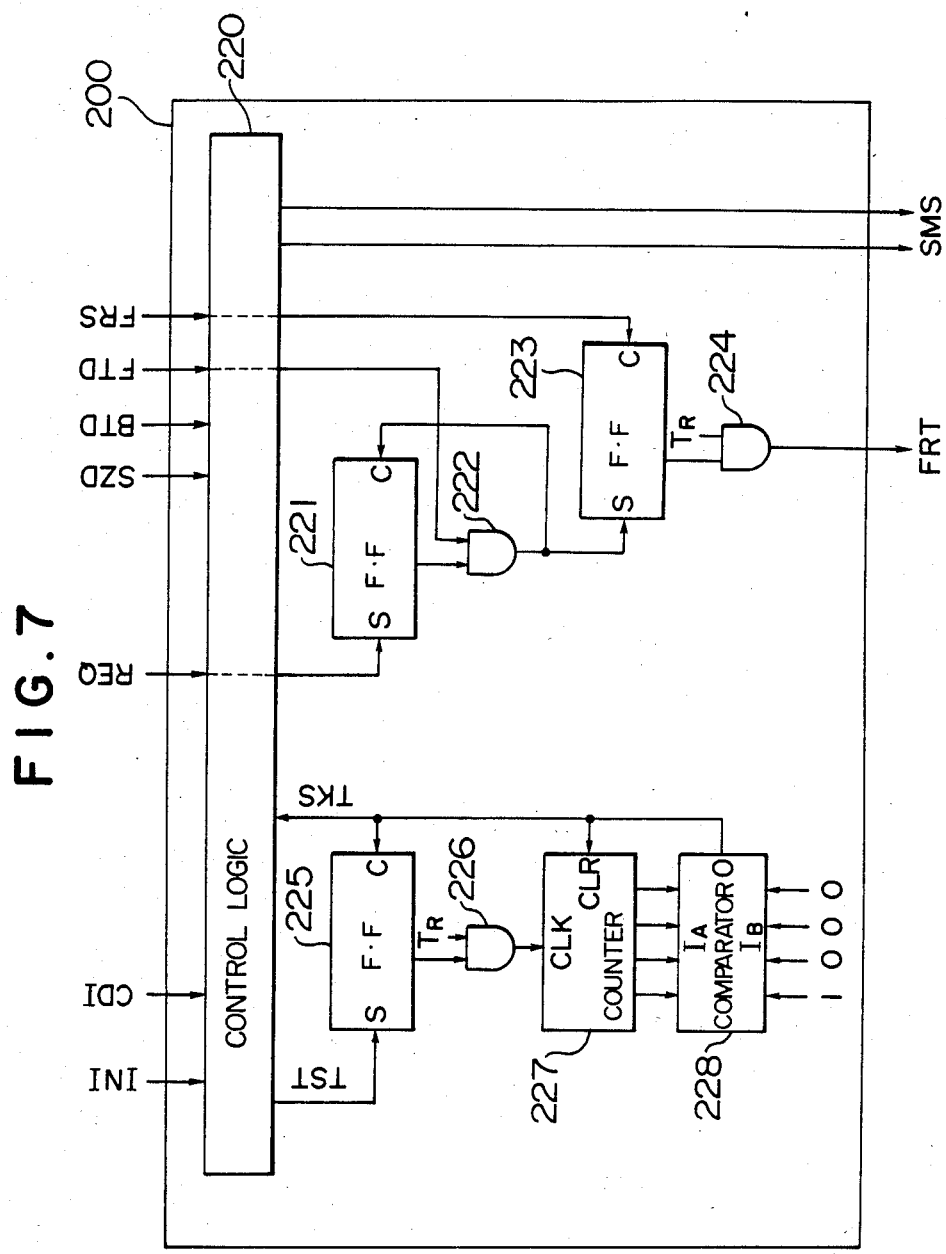
FIG. 7 is a view showing a circuit configuration of a multiplexer channel controller shown in FIG. 6.

FIG. 7 shows in a block diagram an exemplary circuit configuration of the multiplexer control logic 200 which is composed of flip-flops 221, 223 and 225, AND gates 222, 224 and 226, a comparator 228 and a control logic 210.

The flip-flop 221 is set by the frame transmission request signal REQ produced by the input/output control LSI 103 and is reset by the free token detection signal FTD = "1" representative of the subsequent detection of the free token. The flip-flop 221 is reset by the output of the AND gate 222 simultaneously with the setting of the flip-flop 223.

The flip-flop 223 is reset by the transmission completion signal FRS supplied from the communication LSI 102.

The AND gate 224 supplies the transmission timing signal FRT to the communication LSI 102 during a time span intervening between the setting and the resetting of the flip-flop 223.

The flip-flop 225 is set by a token transmission activating command TST supplied from the control logic 210 and reset by the token sending completion or end signal TKS.

In the set state of the flip-flop 225, the clock signal $T_R$ is inputted to the counter 227 through the AND gate 226 for incrementing the content of the counter 227. When the count value of the counter 227 has attained "8", the comparator 228 produces a coincidence output signal which constitutes the token sending end signal TKS.

Figure 8:
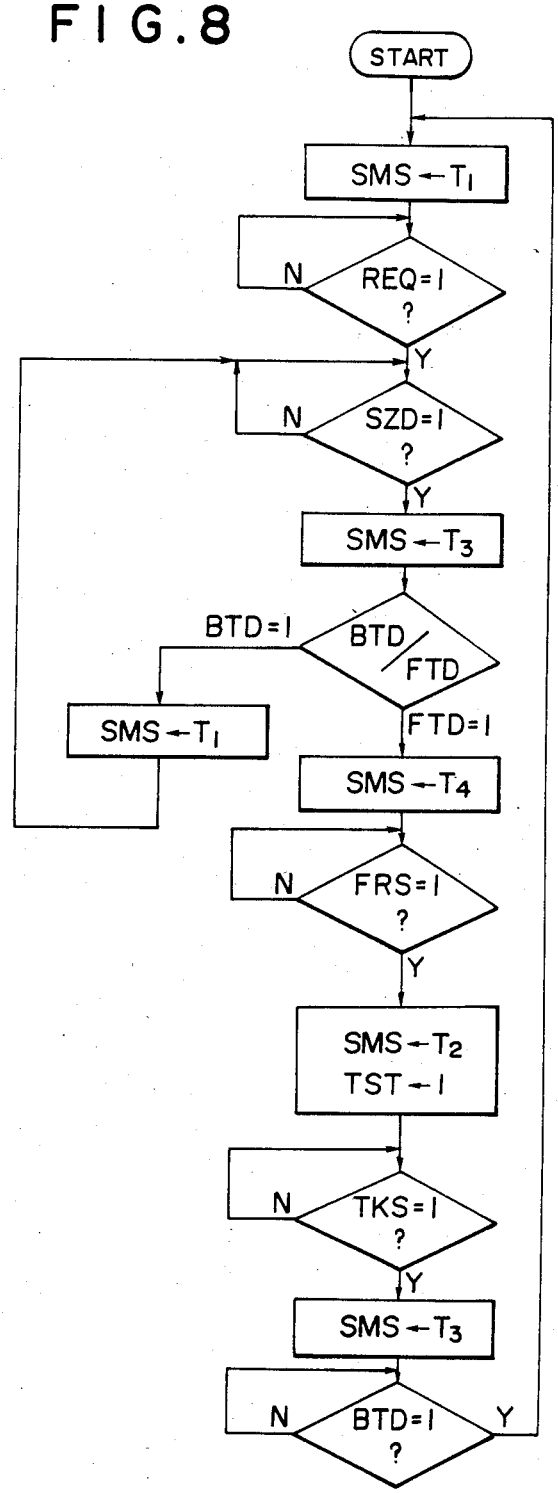
FIG. 8 shows a flow chart for illustrating operation of the circuit shown in FIG. 6.

Next, description will be made of operations of the circuits shown in FIGS. 6 and 7 by referring to FIG. 8.

In the station 2, the select signal SMS supplied to the multiplexer 214 is so commanded as to select the input terminal $T_1$ (as represented by SMS←$T_1$), and the presence or absence of the transmission request signal REQ from the input/output control LSI 103 is checked while repeating or relaying the received information RD. When the transmission request signal REQ is produced, the multiplexer control logic 200 sets the flip-flop 221 as shown in FIG. 7. When the seven successive bits of "1" are detected in the received information RD in this state, the output signal SZD of the comparator 209 is logic "1", as a result of which the input terminal $T_3$ is selected by the select signal SMS. Accordingly, the multiplexer 214 subsequently produces the bit of "0" as the output signal, which means that the multiplexer 214 outputs the busy token represented by the seven successive bits of "1".

The processing to be next executed depends on whether the free token FTD or the busy token BTD is detected in the received information RD. In case BTD = "1", i.e. when the busy token BTD is detected, the select signal SMS is so set as to select the input terminal $T_1$ to wait for the next SZD = "1". In case FTD = "1", i.e. when the free token is detected, the input terminal $T_4$ of the multiplexer 214 is selected by the select signal SMS to thereby allow the transmission data from the communication LSI 102 to be outputted. When the frame transmission end signal FRS is "1", the flip-flop 223 is set, resulting in that the frame transmission timing FRT supplied to the communication LSI 102 from the AND gate 224 is stopped.

Subsequently, the input terminal $T_2$ of the multiplexer 214 is selected by the select signal SMS, to thereby set the token transmission activating signal TST to "1". Next, it is checked by the comparator 228 whether the sending of the token has been completed (i.e. TKS = "1"). In case TKS = "1", the select signal SMS for causing the multiplexer 214 to select the input terminal T₃ is produced. This state is maintained until the busy token BTD becomes equal to "1".

So long as the input terminal T₃ is selected, the transmitter 216 produces all zeros "0s" as the dummy information DUM.

When the busy token BTD="1" is detected, the repeating mode is resumed, wherein the input terminal T₁ of the multiplexer 214 is selected and the similar operations are repeated.

Figure 9:
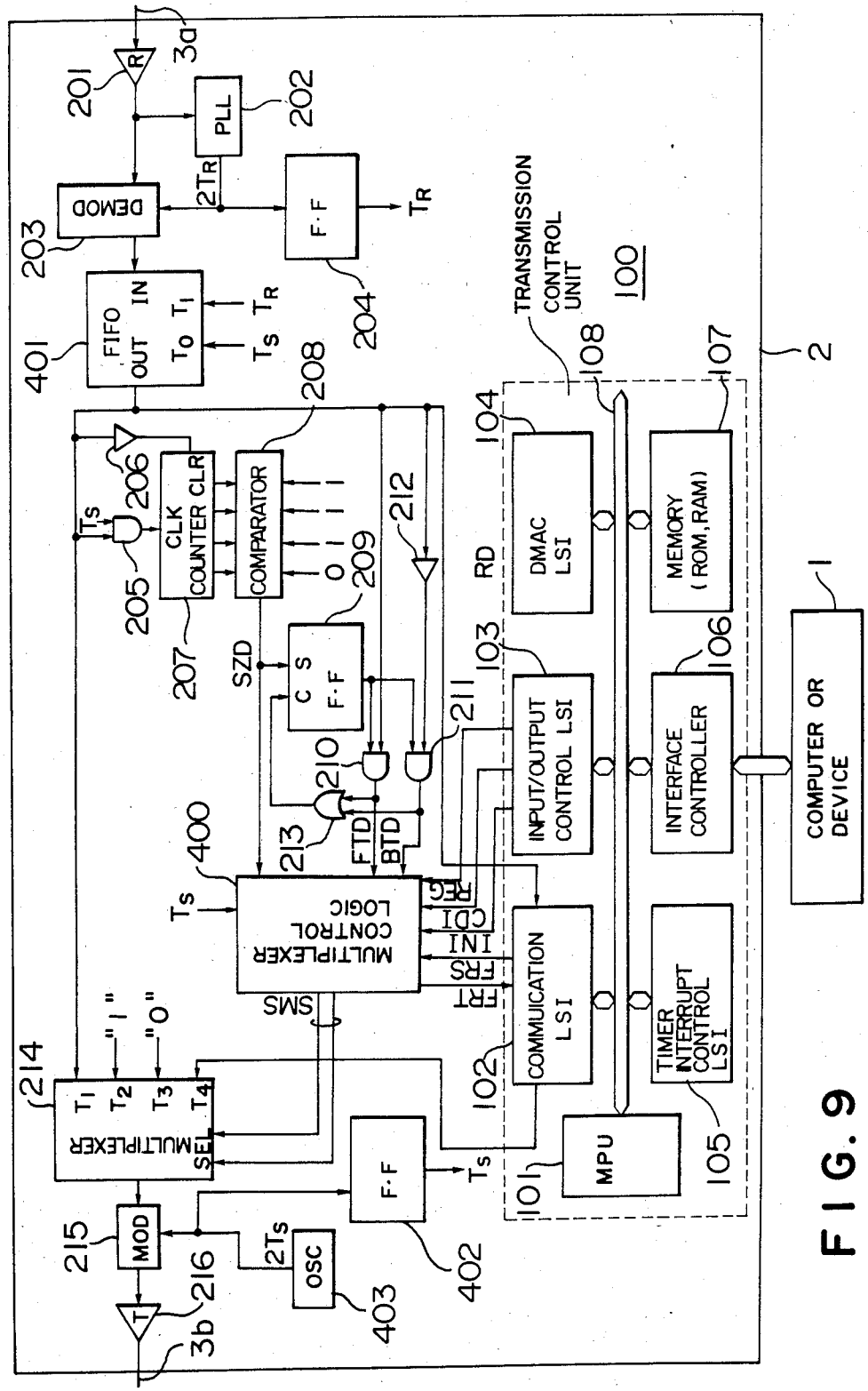
FIG. 9 shows in a block diagram a hardware structure of the supervisory station (4) shown in FIG. 1.

FIG. 9 shows in a block diagram an exemplary hardware structure of the supervisory station 4 shown in FIG. 1. In FIG. 9, the same symbols are used to denote same parts as those of the transmission station 2. In the supervisory station 4, the output signal of the demodulator 203 is utilized for preparing the received information RD by way of a first-in first-out (or FIFO) buffer 401.

Although the output signal $T_R$ of the flip-flop 202 is used as the input timing clock for the FIFO buffer 401, the output timing clock is constituted by a clock signal $T_S$ derived through frequency division of an output signal $2T_S$ of an oscillator 403 by a flip-flop 402.

Figure 10:
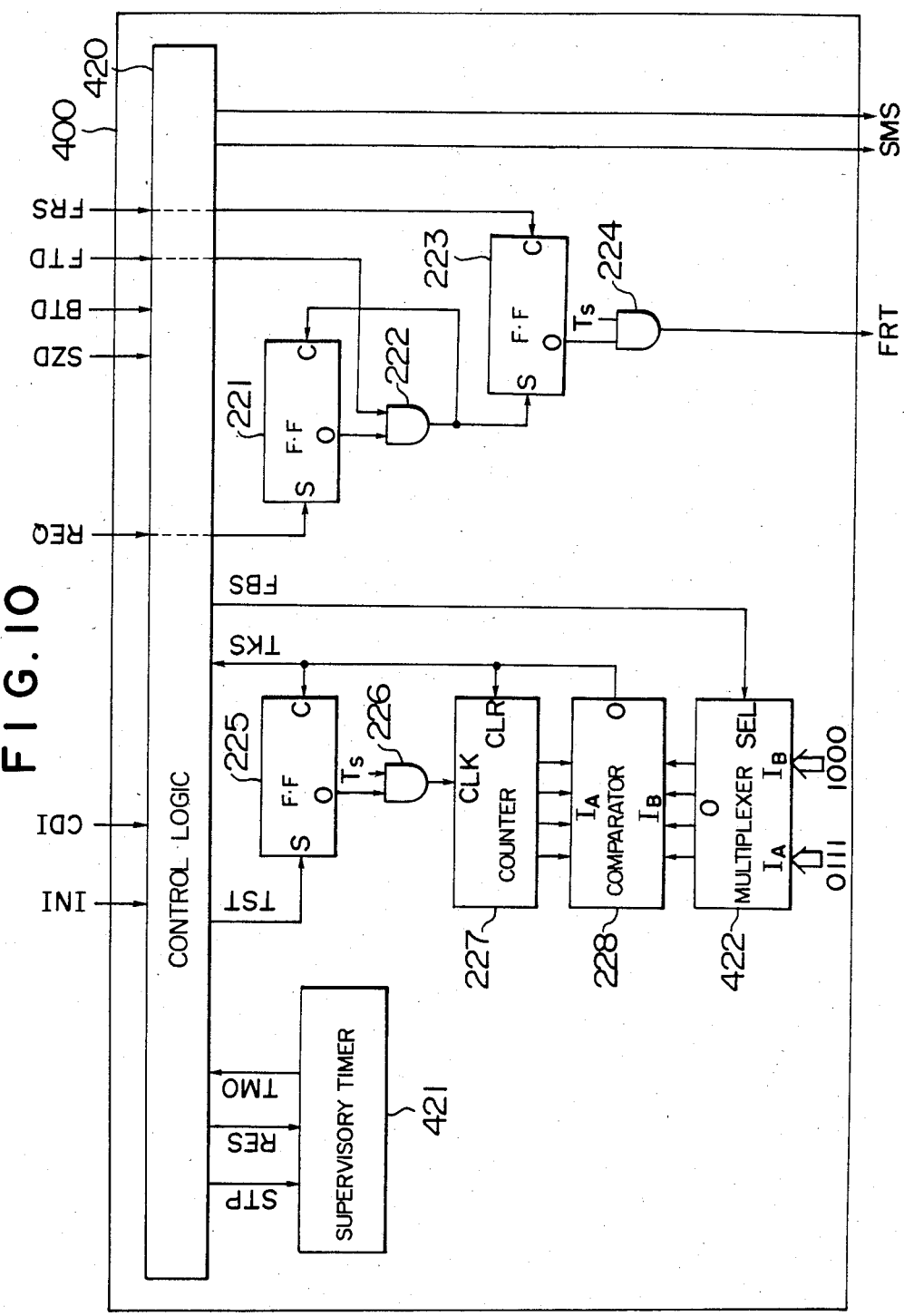
FIG. 10 shows in a block diagram a circuit configuration of a multiplexer channel controller shown in FIG. 9.

The provision of the FIF0 buffer 401 is for the purpose of compensating the loop round trip delay. A multiplexer control logic 400 corresponds to the multiplexer control logic 200 shown in FIG. 6 and is additionally provided with a supervisory timer 421, a select command FBS for selecting the free token or the busy token, and a multiplexer 422, as is shown in FIG. 10. A control logic 420 shown in FIG. 10 corresponds to the control logic 220 shown in FIG. 7 but differs from the latter as indicated by different reference symbols.

Figure 11:
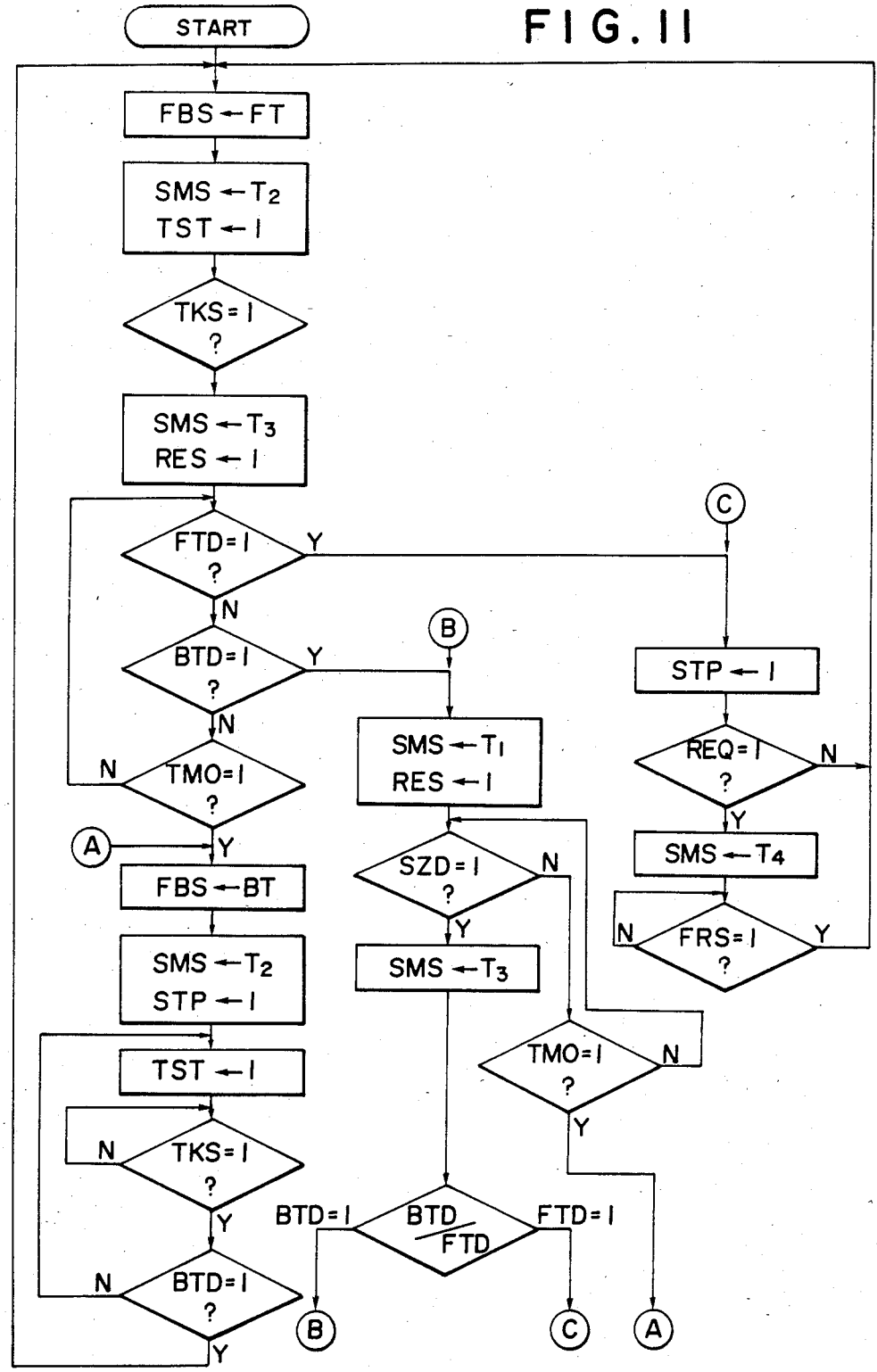
FIG. 11 shows a flow chart for illustrating operation of the controller shown in FIG. 10.

The supervisory timer 421 starts the count in response to the re-start command RES produced by the control logic 420 and produces a time-out or expiration signal TMO unless stop command STP makes appearance within a predetermined time $T_0$. The multiplexer 422 supplies to the comparator 228 reference signals for comparison with the free token (1000=8) and the busy token (0111=7), respectively. FIG. 11 shows a flow chart for illustrating, by way of example, operation of the circuit shown in FIG. 9.

In the multiplexer control logic 400, the control logic 420 first produces a select command FBS for selecting the free token. Next, the input terminal T₂ of the multiplexer 214 is selected by the select command SMS, while the token transmission activating signal TST is set to "1".

Upon completion of the sending of the token (TKS="1"), the input terminal T₃ is selected by the select command SMS to thereby allow the dummy signal (all "0s") to be outputted.

Simultaneously with the sending of the dummy signal, the re-start signal command RES for the supervisory timer 421 is set to "1" for performing the supervision of the timer 421.

When the free token is detected (i.e. FTD="1"), the stop signal (STP="1") is produced to the supervisory timer 421 to thereby stop the stepping operation of the latter. In case the free token is not detected, it is checked whether the busy token is detected (BTD="1") or not. When BTD="1", the input terminal T₁ of the multiplexer 214 is selected by the select signal SMS for establishing the repeat mode, while the re-start command RES="1" is simultaneously supplied to the supervisory timer 421.

Unless BTD="1" is detected, it is checked whether the predetermined time expires (TMO="1") or not. In case TMO="0", it is again checked whether FTD="1" or not. Upon detection of TMO="1", it is determined that abnormality occurs in the line and FBS is set to BT, to thereby allow the busy token select signal to be produced. The input terminal T₂ of the multiplexer 214 is then selected by the select signal SMS, whereby the stop command (STP="1") is supplied to the supervisory timer 421.

Next, the token sending command TST="1" is outputted and it is checked whether the token sending has been completed (TKS="1") or not.

Upon completion of the token sending (TKS="1"), it is checked whether the busy token is detected (BTD="1") or not. In case BTD="0", the busy token is repeatedly sent out. When BTD="1", it is determined that the abnormality of the line is eliminated. Accordingly, FBS is set to FT to allow the free token to be sent out.

When the free token is again detected after the sending of the free token, it is checked whether the frame transmission request REQ is present or not. In case REQ="0", the free token sending mode is regained. In case REQ="1", the input terminal T₄ is selected by the select signal SMS for outputting the transmission frame from the communication LSI 102 on the transmission path 3b by way of the modulator 215 and the transmitter 216. Upon detection of FRS="1" indicating the completion or end of transmission, the free token sending mode is regained. When the busy token is detected (BTD="1") after the sending of the free token, the input terminal T₁ of the multiplexer 214 is selected by the signal SMS for establishing the repeat or relay mode, with the re-start command RES="1" being supplied to the supervisory timer 421. Subsequently, it is checked whether SZD="1" or not. In case SRD="0", it is checked whether the time expires or not. Upon detection of the time expiration (TMO="1"), the routine Ⓐ is executed for allowing the busy token to be outputted (FB=BT). Upon detection of TMO="0", it is again checked whether SZD="1" or not. When SZD="1" is detected, the input terminal T₃ of the multiplexer is selected by the select signal SMS (i.e. SMS=T₃), to check whether BTD="1" or FTD="1". In case BTD="1", a routine Ⓑ is executed for resuming the repeat mode. On the other hand, when FTD="1", a routine Ⓒ is executed for supplying the stop signal (STP=1) to the supervisory timer 421.

As will be appreciated from the foregoing description, there has been provided a loop-type data transmission system according to the invention in which only the supervisory station performs detection of the transmission failure and the control such as restoration and is so arranged as to convert the free token detected in the course of re-construction and repeating of the received information into the busy token before re-sending the free token. By virtue of this feature, the individual transmission stations are freed of the detection of the transmission failure, the control of the restoration and the control for re-sending of the token, whereby the processing for transmission can be simplified.

We claim:

1. A loop type transmission system comprising a plurality of data transmission stations connected in cascade along a loop transmission line in which any station that has completed a transmission of data sends out token information to be used for determining the next station to perform transmission of its data, said token information being either a free token which represnts that the loop transmission line is in a condition for any station to assume control of the loop transmission line to transmit data thereon or a busy token which represents that the loop transmission line is in a condition in which a station is currently transmitting data thereon, any station having a transmission request to transmit data on the loop transmission line sequentially detecting a free token on the loop transmission line, transmitting a busy token onto the transmission line, transmitting its data onto the loop transmission line, and transmitting a free token onto the loop transmission line, said station which transmits the data onto the loop transmission line subsequent to transmission of the data changing from a data transmitting state into a state of repeating data and tokens received from other stations upon detection of a busy token.

2. A loop data transmission system according to claim 1 wherein only one of the plurality of said stations is a supervisory station which receives said busy token and in response thereto changes state from a state of transmitting data into a state of repeating data and tokens from other stations and thereafter transmits the data and free token transmitted by the station transmitting the data and free token.

3. A loop type data transmission system in accordance with claim 1 wherein all of stations assuming control of loop transmission line to transmit data sequentially transmit the data, a free token and dummy data, the transmission of the dummy data being stopped when the station transmitting the data receives a busy token which causes that station to change state from a state of transmitting data onto the loop transmission line into a state of repeating data and tokens received from other stations.

4. A loop type data transmission system according to claim 2 wherein the supervisory station includes a supervisory timer for detecting the absence of either a free token or a busy token over a predetermined time, wherein the supervisory station repeatedly sends out a busy token upon the timer reaching the expiration of the predetermined time and subsequently sends out a free token after confirmation of the return of said busy token.

* * * * *